(12) United States Patent
Mukhi

(10) Patent No.: US 7,853,568 B2
(45) Date of Patent: Dec. 14, 2010

(54) HIGH SPEED DATA HISTORIAN

(75) Inventor: Sulton Q. Mukhi, Sugar Land, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 487 days.

(21) Appl. No.: 11/681,063

(22) Filed: Mar. 1, 2007

(65) Prior Publication Data

US 2008/0215641 A1 Sep. 4, 2008

(51) Int. Cl.
*G06F 7/00* (2006.01)

(52) U.S. Cl. ...................... 707/661; 707/609

(58) Field of Classification Search ............. 707/200, 707/202–204, 600–704
See application file for complete search history.

(56) References Cited

U.S. PATENT DOCUMENTS

| | | | | |
|---|---|---|---|---|
| 5,325,522 A * | 6/1994 | Vaughn | ............... | 707/1 |
| 5,333,315 A * | 7/1994 | Saether et al. | ............... | 707/1 |
| 5,511,190 A * | 4/1996 | Sharma et al. | ............... | 707/1 |
| 5,636,036 A * | 6/1997 | Ashbey | ............... | 386/8 |
| 5,819,296 A * | 10/1998 | Anderson et al. | ............... | 707/204 |
| 5,867,483 A * | 2/1999 | Ennis et al. | ............... | 370/252 |
| 5,943,688 A * | 8/1999 | Fisher et al. | ............... | 711/162 |
| 6,041,420 A * | 3/2000 | Skarpelos et al. | ............... | 714/7 |
| 6,647,415 B1 * | 11/2003 | Olarig et al. | ............... | 709/224 |
| 6,668,619 B2 | 12/2003 | Yang et al. | | |
| 6,907,505 B2 * | 6/2005 | Cochran et al. | ............... | 711/162 |
| 7,161,487 B1 * | 1/2007 | Tracey et al. | ............... | 340/572.1 |
| 7,428,604 B2 * | 9/2008 | Black | ............... | 710/31 |
| 2002/0112116 A1 * | 8/2002 | Nelson | ............... | 711/103 |
| 2003/0149702 A1 * | 8/2003 | Saffer et al. | ............... | 707/102 |
| 2004/0254949 A1 | 12/2004 | Amirthalingam | | |
| 2006/0059181 A1 * | 3/2006 | Hutchins et al. | ............... | 707/101 |
| 2006/0253499 A1 * | 11/2006 | Zhao | ............... | 707/200 |
| 2006/0259948 A1 | 11/2006 | Calow et al. | | |
| 2007/0136324 A1 * | 6/2007 | Xu et al. | ............... | 707/100 |
| 2007/0185913 A1 * | 8/2007 | Reichert et al. | ............... | 707/200 |
| 2009/0006499 A1 | 1/2009 | Mukhi et al. | | |

FOREIGN PATENT DOCUMENTS

WO 2007014221 A 2/2007

OTHER PUBLICATIONS

PCT Search Report and Written Opinion for PCT/IB2008/050583.
Office Action dated Oct. 15, 2009 for U.S. Appl. No. 11/771,557.

* cited by examiner

*Primary Examiner*—Etienne P LeRoux
*Assistant Examiner*—Jessica N Le
(74) *Attorney, Agent, or Firm*—Donna Blalock Holguin

(57) ABSTRACT

Techniques for operating an archival database, referred to as a historian, are disclosed. The historian may be used to archive values from a real-time database. Data values to be archived in the historian are first written to a short-term, high-availability repository, such as a memory-mapped database. As data values "fill" the short-term repository, an archival processor application may be configured to "drain" them from the short-term repository and store them in a high-capacity, long-term archive, such as a disk-based database. Thus, the short-term repository may be used to provide fast access to the recent operational history of a monitored system, (e.g., a complex pipeline network), where long-term archive may be used to provide access to a comprehensive operational history of the monitored system.

24 Claims, 7 Drawing Sheets

HIGH SPEED DATA HISTORIAN

BACKGROUND

Generally, a pipeline system provides a continuous pipe conduit that may include a variety of components and equipment, e.g., valves, compressor stations, communications systems, and meters. A pipeline may be used to transport liquid or gaseous materials from one point to another, usually from one point (or points) of production or processing to another, or to points of use. For example, an air separation unit may be used to separate atmospheric air into gaseous components (e.g., oxygen gas ($O_2$) nitrogen gas ($N_2$) hydrogen gas ($H_2$), Argon gas (Ar), etc.) At compressor stations, compressors maintain the pressure of the material in the pipeline as it is transported from one site to another. Similarly, for a liquid bearing pipeline, pumps may be used to introduce and maintain pressure for a liquid substance transported by the pipeline.

Obviously, running and maintaining a pipeline system can be expensive and complex, and the operations of a pipeline system are frequently coordinated and controlled from a central operations control center. At such a control center, an operator may monitor the operational state of the pipeline, and each of its constituent elements. To perform this task, software applications are available that monitor the operational state of pipeline components, including compressors and pumps, valves, segments, etc. Sensors affixed to these (and other) field devices are configured to relay information regarding a then current state of the device to the control center. A real-time status database is used to capture this information and make it available to the relevant individuals at the control center. In some cases, the monitoring systems may be configured to raise an alarm when a monitored parameter (or combination of parameters) falls below (or climbs above) a predetermined value.

Other complex industrial systems and processes use a similar approach. For example, a petroleum refinery (at one end of a pipeline) may be monitored from a central control center using a real-time status database configured to receive data collected from the field devices of the refinery. Fleet management applications used to monitor the location and status of a fleet of delivery vehicles provide another example of a large complex operation that may be monitored from a central control center using a real-time status database.

For these systems, a central concern is the ongoing operational state of the system at any given point in time, and the real-time status database is an effective tool for monitoring this. Frequently however, system operators need access to not just the current status available from the real-time database, but also need access to historical data regarding the operational state of the system. Such information may be needed for a variety of purposes, including, for example, optimizing system operations, understanding the impact of changes over time, ensuring regulatory compliance, and many other applications. Accordingly, the control center for a pipeline (or other industrial system) may include a "historian database," or more simply, a "historian." A historian is used to archive values from the real-time status database for the monitored field devices. That is, while the real-time status database may record the current pressure at a given pipeline location, the historian may store what the same value was a minute, hour, day week, or even years ago. The historian may be queried for historical values by the relevant individuals at the control center.

Ideally, whenever any value in the real-time database changes, the previous value should be archived by the historian. Additionally, some values may need to be archived at regular intervals, regardless of whether the value has changed. However, pipeline systems are large and complex with hundreds, if not thousands, of monitored field devices, and thousands, if not tens-of-thousands, of monitored parameters. Other large industrial operations may be similarly complex. Given the scope of these types of industrial operations, the amount of data pushed from the real-time database to the historian may be enormous. If the historian cannot keep up, data values for some points in time may be lost. Some currently available historian applications address this issue by limiting the volume of historical data that may be archived by the historian. Other historians may be configured to use a "best effort" approach, and archive as much data as it can, but to drop data when it is pushed to the historian at a sufficient rate. In either case, the archived data may not be suitably comprehensive for some purposes. Additionally, due to the enormous amount of process data some plants produce, a historian may be configured to store data offline, (i.e., apart from the system running the historian itself). However, such an approach may lead to unacceptable delays when the operator wishes to query the historian to retrieve historical operational state data for the monitored system.

Accordingly, comprehensively capturing data in a historian, and making this information available to a system operator, is a difficult task. Therefore, there remains a need for techniques for managing a historian in large, complex industrial operations such as a pipeline.

SUMMARY

Embodiments of the invention provide techniques for operating an archival database, referred to as a historian, used to record values from a real-time database. The real-time database may be used to monitor the current operational state of a large industrial system, such as a pipeline. In turn, the historian may be used to archive the data stored by the real-time database.

One embodiment of the invention provides a method of archiving a plurality of data values from a real-time database in a historian database. The historian database may include a short-term repository and a long-term archive. The real-time database may be configured to monitor a current operational state of an industrial system and the plurality of data values correspond to information reflecting an operational parameter of one or more monitored devices of the industrial system. The method generally includes obtaining one of the data values from the real-time database. The obtained data value may be stored in a tag that includes a timestamp and a tag ID identifying a monitored parameter in the real-time database. The method also includes evaluating the tag to determine whether to store the tag in the historian database, and, upon determining to store the tag in the historian database, storing the tag in the short-term repository. The method also includes evaluating a set of tags in the short-term repository to determine whether to store any of the set of tags in the long-term archive, and, upon determining to store one or more of the set of tags in the long-term archive, copying the tag from the short-term repository to the long-term archive and removing the tag from the short-term repository.

Another embodiment of the invention includes a computer computer-readable storage medium containing a program for archiving a plurality of data values from a real-time database in a historian database, the program including instructions for performing an operation. The real-time database may be configured to monitor a current operational state of an industrial system. Also, the plurality of data values may reflect an operational parameter of one or more monitored devices of the industrial system. The operation may generally include obtaining one of the data values from the real-time database. The obtained data value may be stored in a tag that includes a timestamp and a tag ID identifying a monitored parameter in the real-time database. The operation also includes evaluating the tag to determine whether to store the tag in the historian database, and, upon determining to store the tag in the historian database, storing the tag in the short-term repository. The operation also includes evaluating a set of tags in the short-term repository to determine whether to store any of the set of tags in the long-term archive, and, upon determining to store one or more of the set of tags in the long-term archive, copying the tag from the short-term repository to the long-term archive and removing the tag from the short-term repository.

Still another embodiment of the invention includes a system archiving a plurality of data values from a real-time database in a historian database. The system may generally include the real-time database, where the real-time database is configured to store a current value for the plurality of monitored data values, and where each of the plurality of data values correspond to information reflecting an operational parameter of one or more monitored devices of an industrial system. The system also includes the historian database, where the historian database includes a short-term repository and a long term archive. The historian database may be configured to obtain one of the plurality of data values from the real-time database. The obtained data value may be stored in a tag that includes a timestamp and a tag ID identifying a monitored parameter in the real-time database. The historian database may also be configured to evaluate the tag to determine whether to store the tag in the historian database, and, upon determining to store the tag in the historian database, to store the tag in the short-term repository. The historian database may also be configured to evaluate a set of tags in the short-term repository to determine whether to store any of the set of tags in the long-term archive, and, upon determining to store one or more of the set of tags in the long-term archive, to copy the tag from the short-term repository to the long-term archive and removing the tag from the short-term repository.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
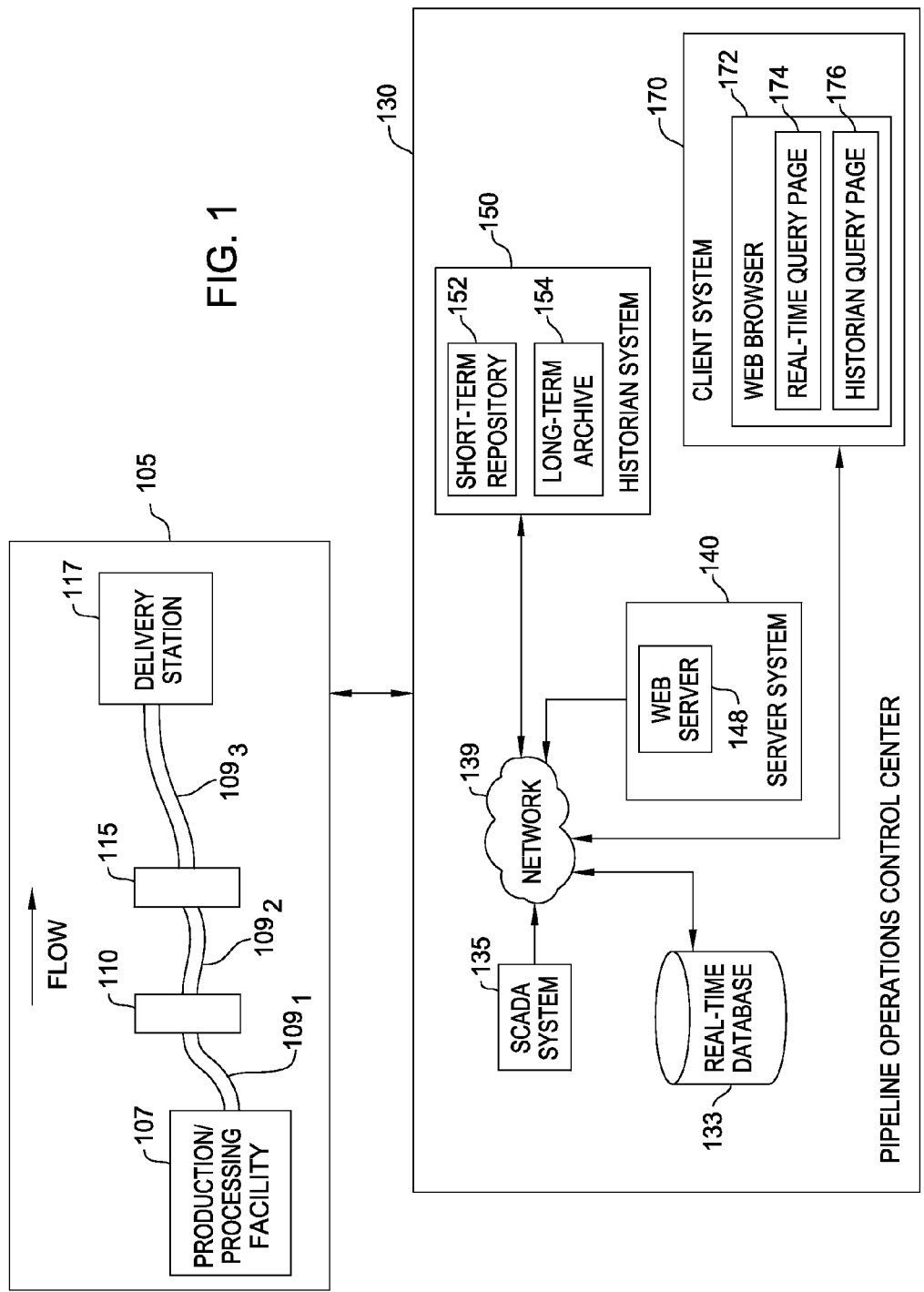
FIG. 1 is a conceptual illustration of a monitored pipeline and an operations control center, according to one embodiment of the invention.

Embodiments of the invention provide techniques for operating an archival database, referred to as a historian. The historian is used to archive values from a real-time database. The real-time database may be used to monitor the current operational state of a large industrial system, such as a pipeline.

In one embodiment, data from the real-time database may be archived in the historian using either periodic monitoring or exception monitoring. The monitoring modes address how and when data values are copied from the real-time database into the historian. As the name implies, periodic monitoring is used to update data in the historian at specific time intervals, regardless of whether an operational state value in the real-time database has changed. In contrast, exception monitoring is used to update data values in the historian whenever a specified event occurs (e.g., a change in the value in the real-time database above a given threshold). Depending on the operational value or field device being monitored, exception monitoring or periodic monitoring may be more appropriate, and both modes are frequently used to monitor different parameters of a system and to archive values from the real-time database in the historian.

In one embodiment, new data values to be archived in the historian are first written to a short-term, high-availability repository, such as a memory-mapped database. As these data values "fill" the short-term repository, an archival processor application may be configured to "drain" values from the short-term repository and migrate the drained values to a high-capacity, long-term archive, such as a disk-based database. Data values may be "drained" based on an amount of space reserved for a particular data value (i.e., a number of measurements recording a monitored parameter over time) in the short-term repository, or data values may be stored in the short-term repository for a particular amount of time before being moved to the long-term archive.

Additionally, if events for archival arrive at a rate greater than the short-term repository can be "filled," or if the space reserved for a given event becomes "full," then events may be written to an overflow file and processed by an overflow processing application. In one embodiment, the events themselves are stored in a data structure referred to as a "tag." Each tag may include an event ID (specifying which event or field device the tag is about) a monitored value (e.g., a pressure/temperature reading) and a timestamp (indicating when the reading for the event occurred).

Additionally, embodiments of the invention are described relative to a historian used to archive data from a real-time status database reflecting a then current operational state of a gas pipeline network. However, one of ordinary skill in the art will recognize that the historian disclosed herein may be adapted for use with a variety of complex, industrial operations that are monitored using a real-time status database.

One embodiment of the invention may be implemented as one or more software programs for use with a computer system. The program(s) include instructions for performing embodiments of the invention (including the methods described herein) and may be stored on a variety of computer-readable storage media. Illustrative computer-readable media includes: (i) non-writable storage media on which information is permanently stored (e.g., read-only memory devices within a computer such as CD-ROM or DVD-ROM disks readable by a CD-ROM or DVD-ROM drive) and/or (ii) writable storage media on which alterable information is stored (e.g., floppy disks within a diskette drive, hard-disk drives, or flash memory devices). Other media include communications media through which information is conveyed to a computer, such as a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

Further, the description herein references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In general, the routines executed to implement the embodiments of the invention, may be part of an operating system or a specific application, component, program, module, object, or sequence of instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a conceptual illustration of a monitored pipeline 105 and an operations control center 130, according to one embodiment of the invention. As shown, monitored pipeline network 105 includes a production/processing facility 107 and a delivery station 117. Facility 107 may represent, for example, a molecular gas generation plant that includes one or more air separation units used to purify gaseous substances from the ambient atmosphere. The resulting product is delivered to station 117 over a pressurized gas pipeline. Illustratively, pipeline 105 includes pipeline segments $109_1$, $109_2$, and $109_3$. Additionally, pipeline 105 includes compressor stations 110 and 115 used to maintain the pressure of gaseous substances transported over pipeline 105.

Compressor stations 110 and 115 may include sensor equipment used to monitor aspects of the operational state of pipeline 105. For a pressurized gas pipeline, for example, a wide variety of field devices and parameters may be monitored including, for example, inlet gas pressure, outlet gas pressure, gas temperature, cooling liquid temperature, flow rates, and power consumption, among others. Similarly, the operational state of various field devices, air separation units, and equipment at production facility 107 and delivery station 117 may be monitored by sensor equipment. Of course, for other industrial networks and or systems, the sensors and/or monitoring equipment may be selected to suit the needs of a particular case.

In one embodiment, the results of the monitoring equipment are transmitted to the pipeline operations control center 130. The pipeline operation control center 130 may employ a number of computer systems running application programs used to coordinate, monitor, and control the operations of pipeline 105. Illustratively, pipeline operations control center 130 includes a SCADA (Supervisory Control and Data Acquisition) system 135, a server system 140, a historian system 150, and a client system 170, communicating with one another over a network 139. The computer systems 135, 140, 150, and 170 illustrated as part of operations control center 130 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 135, 140, 150, and 170 are simplified to highlight aspects of the present invention and that computing systems and networks typically include a variety of components not shown in FIG. 1.

SCADA system 135 centralizes process data and allows remote monitoring and control of pipeline 105. As is known, a SCADA system 135 may be configured to gather data in real time from remote locations in order to control equipment and conditions in pipeline 105. The monitored data may be stored in real-time database 133. That is, the real-time database 133 may store a number of data tags, where each tag identifies a monitored parameter of pipeline 105 and the current operational value of that parameter. The tags may be written into real-time database 133 periodically, where the value for a tag is updated at regular intervals, or exception based, where a new value for a tag is written into real-time database 133 only when the monitored value changes more than a predetermined value. SCADA system 135 may include both hardware and software components. The hardware gathers and feeds data into SCADA system 135, which processes this data and presents it to a user on client system 170.

Illustratively, historian system 150 includes a short term repository 152 and a long term archive 154. In one embodiment, the historian system 150 may be configured to retrieve (or receive) tags from real-time database 133, and store the tags in short-term repository 152. Over time, data tags in the short-term repository 152 may be moved to long-term archive 154. Further, short term repository 152 may be a high-speed memory mapped database and long term archive 154 may be a high-capacity disk based database. Thus, the short-term repository 152 may be used to provide fast access to the recent operational history of the pipeline 105, where long-term archive 154 may be used to provide access to a comprehensive operational history of pipeline 105.

As shown, client system 170 includes a user-interface used to access data from real-time database 133 and historian 150. For example, client system 170 may include a web browser 172 used to access a real-time query page 174, and a historian query page 176. Pages 174 and 176 may include the appropriate interface elements to compose and perform queries of short term repository 152 and long term archive 154. Web server 148 may be configured to provide a specific service to client software (e.g., web browser 172). As is known, web server 148 is a software application configured to manage and share web based applications accessible using other computers connected by a network. In the context of the present invention, the web server 148 may be configured to retrieve values from real time database 133 and historian 150 and transmit this information to client computer system 170. For example, web server 148 may be configured to transmit HTML web pages rendered by web browser 172, where the content of the web pages presents the information from real-time database 133 and historian 150 to a user in a structured format.

Note, although real-time database 133, server system 140, historian system 150, and client system 170, are shown as separate components, one of ordinary skill in the art will recognize that these components may be applications running on a single computer system, or on multiple computer systems, and further, that these components may be configured in a variety of ways.

Figure 2:
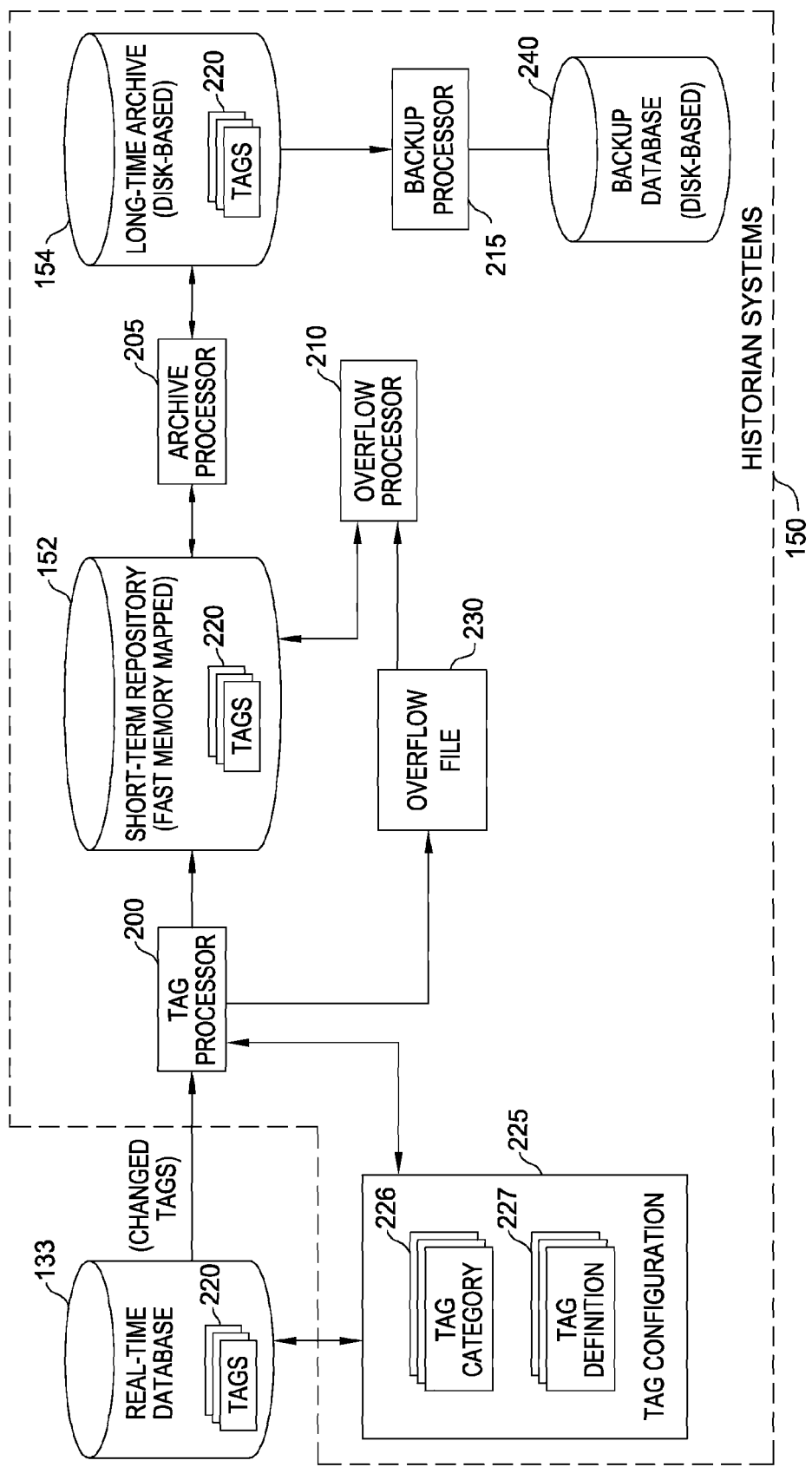
FIG. 2 is a conceptual illustration of components of an archive historian, according to one embodiment of the invention.
Figure 3:
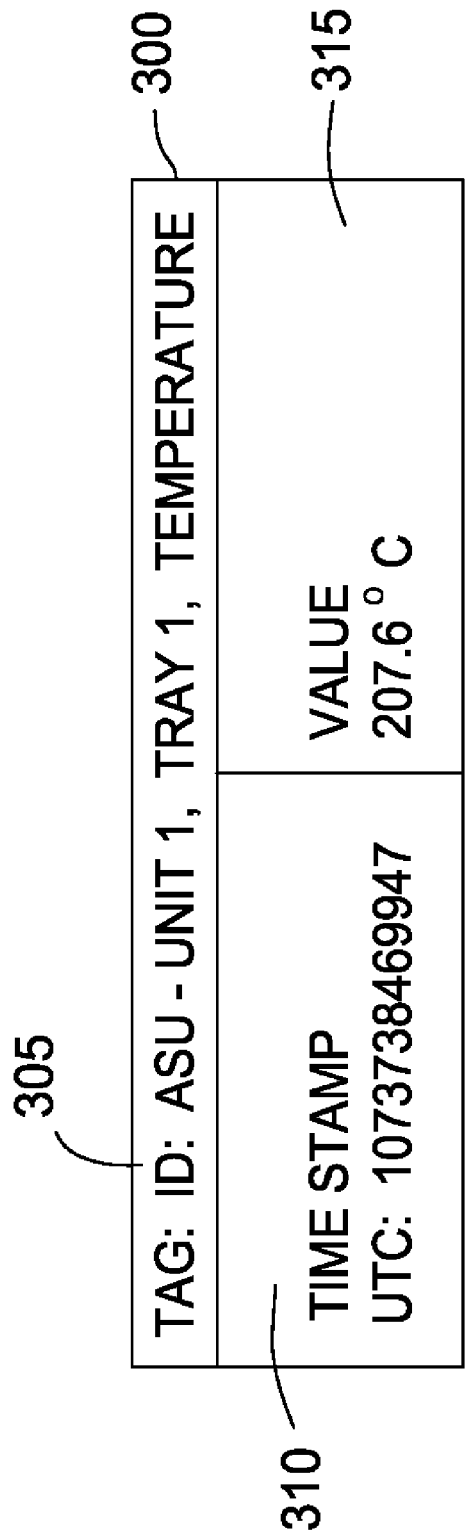
FIG. 3 is a conceptual illustration of a data tag recording a monitored value for a field device at a specific point in time, according to one embodiment of the invention.

FIG. 2 is a conceptual illustration of components of historian 150, according to one embodiment of the invention. Illustratively, FIG. 2 includes software applications 200, 205, 210 and 215 used to manage tags 220 as they are copied from real-time database 133 to storage in short-term repository 152 and long-term archive 154. In one embodiment, each "tag," may be an instance of a data structure used to store a value in real-time database 133 and historian 150. In other words, each instance of a tag may be used to record a value for a particular monitored field device at a particular point in time. For example, a tag may store a monitored temperature or pressure value for a field device at one of compressor stations 110 or 115, measured at the specific time indicated by the tag. FIG. 3, described below, provides an example data structure for a tag 220. The structure of tags 220 may be defined according to a tag configuration 225. In one embodiment, tag configuration 225 includes tag categories 226 and tag definitions 227. In one embodiment, tag categories 226 may specify, among other things, which tags are captured by historian 150; whether data values are archived on a periodic basis (i.e., at regular intervals); the period at which values are archived from real-time database 133 (e.g., an interval of seconds, minutes, hours, etc); or whether data values are archived on an exception basis (i.e., tags are archived upon a sufficient change in the value for that tag in real time database 133). Tag definitions 227 may specify a set of valid tags, and data types for monitored values.

In one embodiment, tag processor 200 may be a software application configured to receive (or retrieve) tags 220 from real-time database 133 and store them in short-term repository 152. As stated, short term repository may be a high-speed memory mapped database used to provide access to the most recent tags archived from real-time database 133. The rate at which tags 220 are processed by tag processor 200 depends on a variety of factors, including, for example, the number of monitored parameters and or field devices, the interval over which periodically based values are archived, and the sensitivity to or probability of change in monitored data values for tags archived on exception basis. In some cases, the rate of change in the tags 220 in real time database 133 may overwhelm the ability of tag processor 200 to receive (or retrieve) tags 220 and store them in the short term repository 152. When this occurs, tag processor 200 may be configured to write tags to an overflow file 230, rather than simply drop tags 220 which processor 200 is unable to process. Similarly, short term repository 152 may have a fixed capacity or may be configured to store only a specific number of recent values for a given tag. In cases where short-term repository 152 is "full" with respect to a given tag, tag processor 200 may be configured to write tags 220 to an overflow file 230, rather than simply drop them.

Tags written into overflow file 230 may be processed by overflow processor 210. In one embodiment, overflow processor 210 may be a software application configured to receive (or retrieve) tags 220 from overflow file 230 and store them in short-term repository 152. For example, overflow processor 210 may be configured to periodically open overflow file 230, determine whether any tags have been written to the overflow file, and if so, whether any such tags may be copied into short-term repository 152.

Where tag processor 200 may be configured to "fill" short-term repository 152 with tags 220, archive processor 205 may be configured to "drain" tags 220 from short-term repository 152 and store them in long-term archive 154. As stated, long-term repository 154 may be a high-capacity disk-based database used to provide access to a comprehensive collection of tags 220 archived from real-time database 133. In one embodiment, archive processor 210 may be a software application configured to receive (or retrieve) tags 220 from short-term repository 152 and store them in long-term archive 154. For example, archive processor 210 may be configured to copy a tag from short-term repository 152 to long-term archive 154 after the tag has been in the short-term repository 154 for a specific period of time. Or archive processor 210 may be configured to copy a tag from short-term repository 152 to long-term archive 154 once a maximum number of tags of a given type have been stored in short-term repository 152. In one embodiment, tag categories 226 and definitions 227 may specify when tags of a given type should be moved from the short term repository 152 into long term archive 154. Additionally, a backup processor 215 may create a backup database 240 of long-term history archive 154.

As stated, each tag 220 may include an event ID (specifying which event or field device the tag is about) a monitored value (e.g., a pressure/temperature reading) and a timestamp (indicating when the reading for the event occurred). FIG. 3 is a conceptual illustration of tag 300 recording a monitored value for a field device at a specific point in time, according to one embodiment of the invention. As shown, tag 300 includes a tag ID 305, a time stamp 310 and a tag value 315. Illustratively, tag 300 represents a tag recording a value for a monitored air separation unit. In this case, tag 300 records a temperature of "207.6° C." for "tray 1" of "ASU Unit 1."

Figure 4:
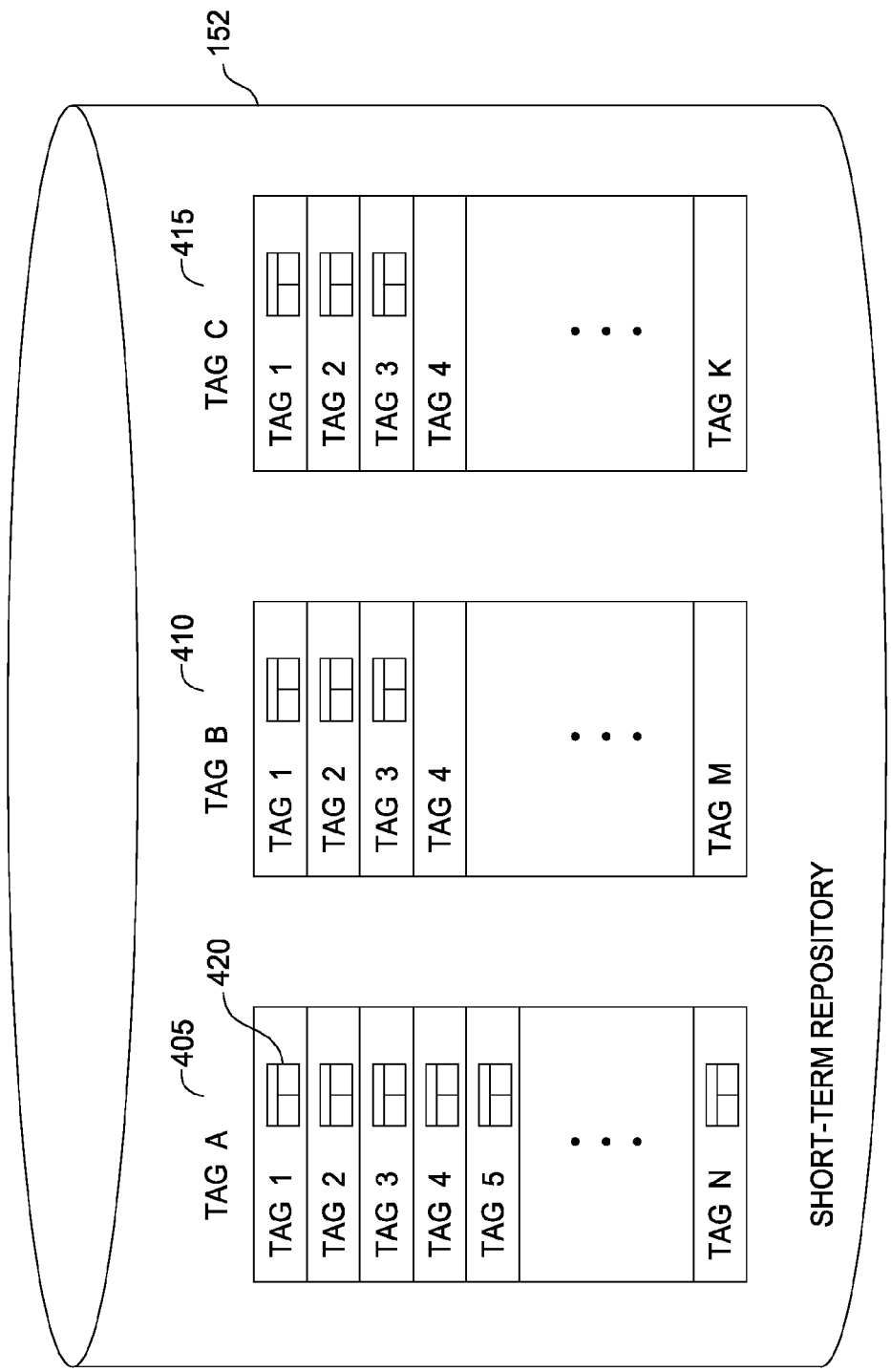
FIG. 4 is a conceptual illustration for a data structure organizing tags in a short-term repository of an archive historian, according to one embodiment of the invention.

FIG. 4 is a conceptual illustration of short-term repository 400, according to one embodiment of the invention. In this example, short-term repository 400, represents a high-speed memory mapped database configured to store up to N historical values for Tag A 405, M historical values for Tag B 410, and K historical values for Tag C 415. Illustratively, whether a tag is currently present in the allocated slots of short-term repository 400 for tags 405, 410, and 415 is represented using an icon 420. As shown, short-term repository 400 includes N values for Tag A 405. That is, the space in short-term repository 400 allocated for tag A 405 is full, as N tags of Type A 405 are present in short-term repository 400. Thus, any new tags of this type received by tag processor 200 are written into overflow file 235 until overflow processor 210 can "drain" some of the tags of Type A 405 from short-term repository 400. In contrast, only three tags of Tag B 410 and three tags of Tag C 415 are currently present in short-term repository 400. Thus, any new tags of type Tag B or Tag C received by tag processor 200 are written into the next allocated slot in short-term repository 400.

Figure 5:
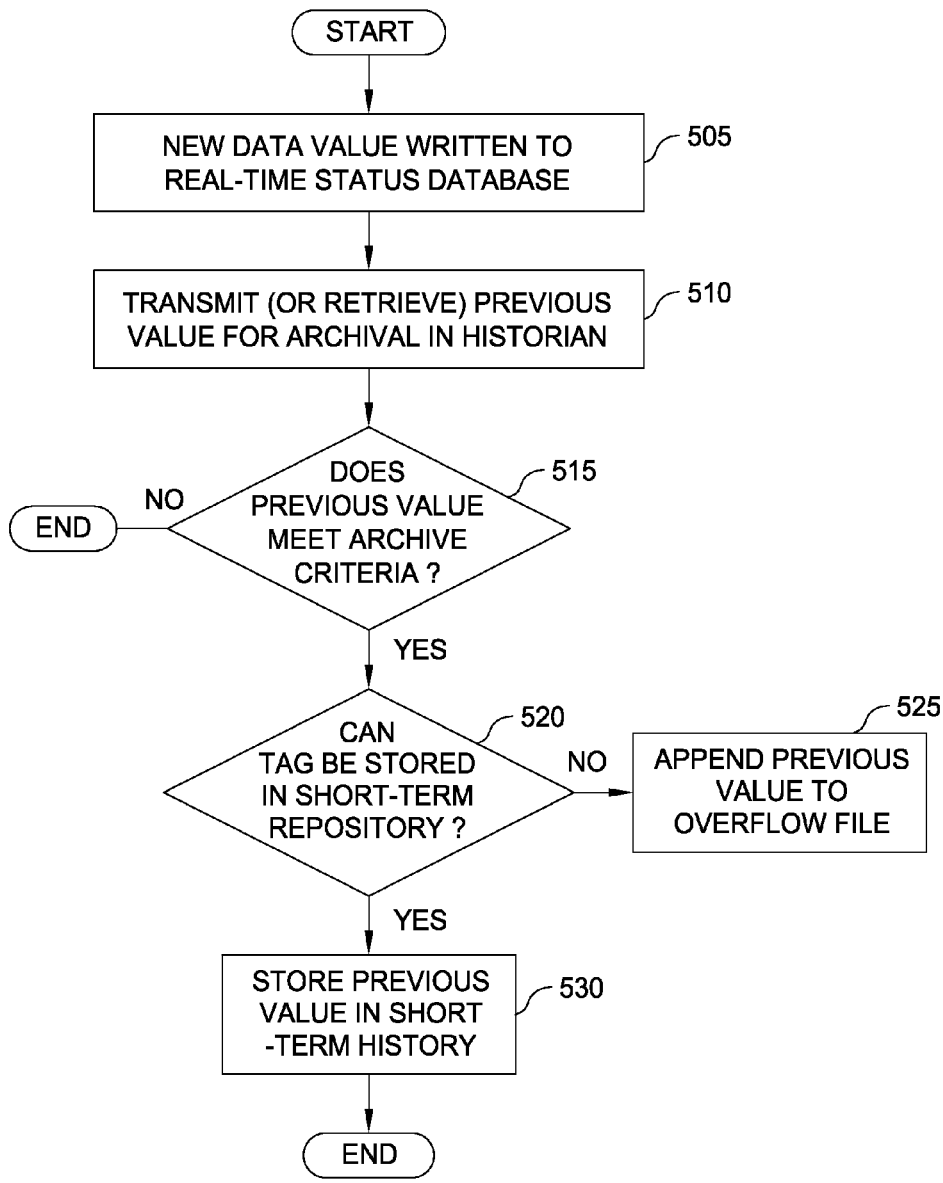
FIG. 5 is a flow diagram illustrating the operations of an archive historian, according to one embodiment of the invention.

FIG. 5 is a flow diagram illustrating the operations 500 of tag processor 200, according to one embodiment of the invention. As shown, operations 500 begin at step 505 where a new data value is recorded for one of the tags 220 in real-time status database (e.g., database 133 of FIG. 1). That is, the operational state of a monitored system (e.g., pipeline 105 of FIG. 1) has changed, and this change is reflected by a tag in real-time status database.

At step 510, the previous value for that tag for may be transmitted to the historian for archival. At step 515, tag processor 200 may be configured to evaluate the changed value and determine whether the received tag should be archived by the historian. For example, as described above, tag categories 226 and tag definitions 227 may specify that tags of a given type are archived only when the value for that tag has changed by a predetermined amount. Thus, the sensitivity at which exception based tags are archived may be tailored to suit the needs of a particular case.

Alternatively, at step 510, tag processor 200 may be configured to retrieve a data value from real the real-time status database. For example, tag configuration 225 may specify that some tags 220 should be archived at a regular interval, regardless of whether the operational state of the monitored system has changed. That is, some tags 220 may be archived at regular intervals even though the value in the real-time database for that tag does not necessarily change between intervals.

At step 520, tag processor 200 may be configured to determine whether the tag processed at step 510 and 515 may be stored in the short term repository. For example, as described above, the short-term repository may allocate space for a specific number of tags of a given type. Also, the tag processor may, in some cases, be overwhelmed by a number of tags received over a short period of time. In either case, if the tag processor is able to copy the tag into short-term history, then at step 530, the tag is stored in the short-term repository. Otherwise, if the tag processor is unable to copy a tag into the short-term repository, then at step 525, the tag may be written to an overflow file. Further, in one embodiment, tags written to the overflow file may be processed by an overflow processor.

Figure 6:
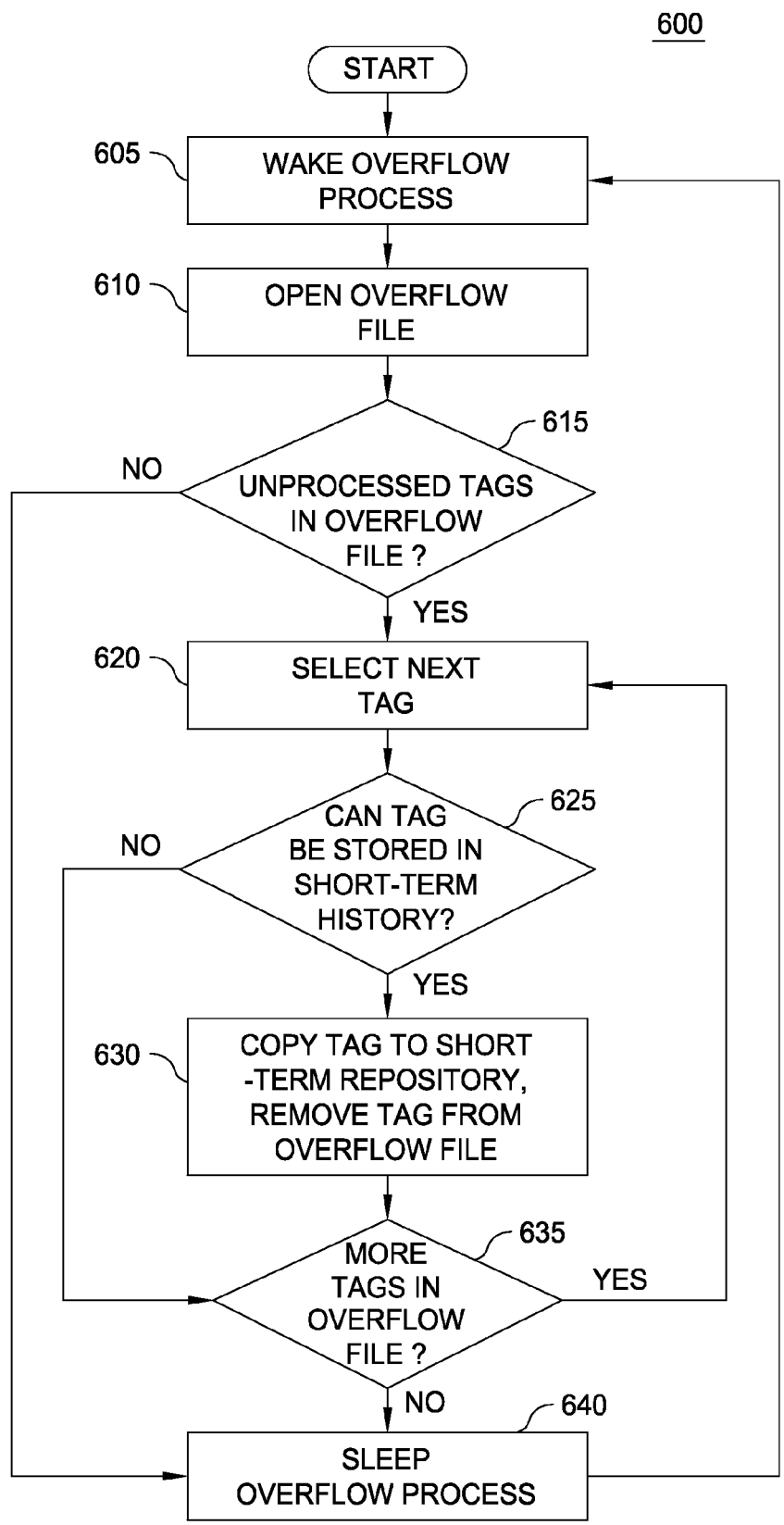
FIG. 6 is a flow diagram illustrating the operations of an overflow processing application of an archive historian, according to one embodiment of the invention.

FIG. 6 is a flow diagram illustrating the operations 600 of an overflow processing application of an archival historian (e.g., overflow processor 210 of FIG. 2), according to one embodiment of the invention. As shown, operations 600 begin at step 605 where an overflow process is awoken. That is, in one embodiment, the overflow process may be configured to "wake-up" at specified intervals and determine whether any overflow processing is necessary. Once "awake," at step 610, the overflow process may be configured to open the overflow file (e.g., overflow file 230 of FIG. 2). At step 615, the overflow process may be configured to determine whether any unprocessed tags have been written to the overflow file. If not, operations 600 may proceed to step 640, where the overflow process may "sleep" for another predetermined interval. Otherwise, where tags have been written to the overflow file, at step 620, the next tag is selected.

At step 625, the overflow process determines whether the tag selected at step 620 can be stored in the short-term repository. For example, in cases where the tag processor 200 receives more tags than it can process, space may be available in the short term repository for the tag selected at step 620. Alternatively, the short term repository may have been sufficiently "drained" to allow the tag selected at step 620 to be stored in the short term repository. If so, at step 630 the overflow process may be configured to copy the tag into the short-term repository and remove the tag from the overflow file. Otherwise, the tag selected at 620 is left in the overflow file, to be processed during a subsequent pass of the overflow file made by the overflow processor. At step 635, the overflow process determines whether more tags are present in the overflow file. If so, operations 600 return to step 620 where the next tag is selected and processed according to steps 625, 630, and 635. Once all the tags in the overflow file have been moved into the short-term repository, operations 600 may proceed to step 640, where the overflow process may "sleep" for another predetermined interval.

Figure 7:
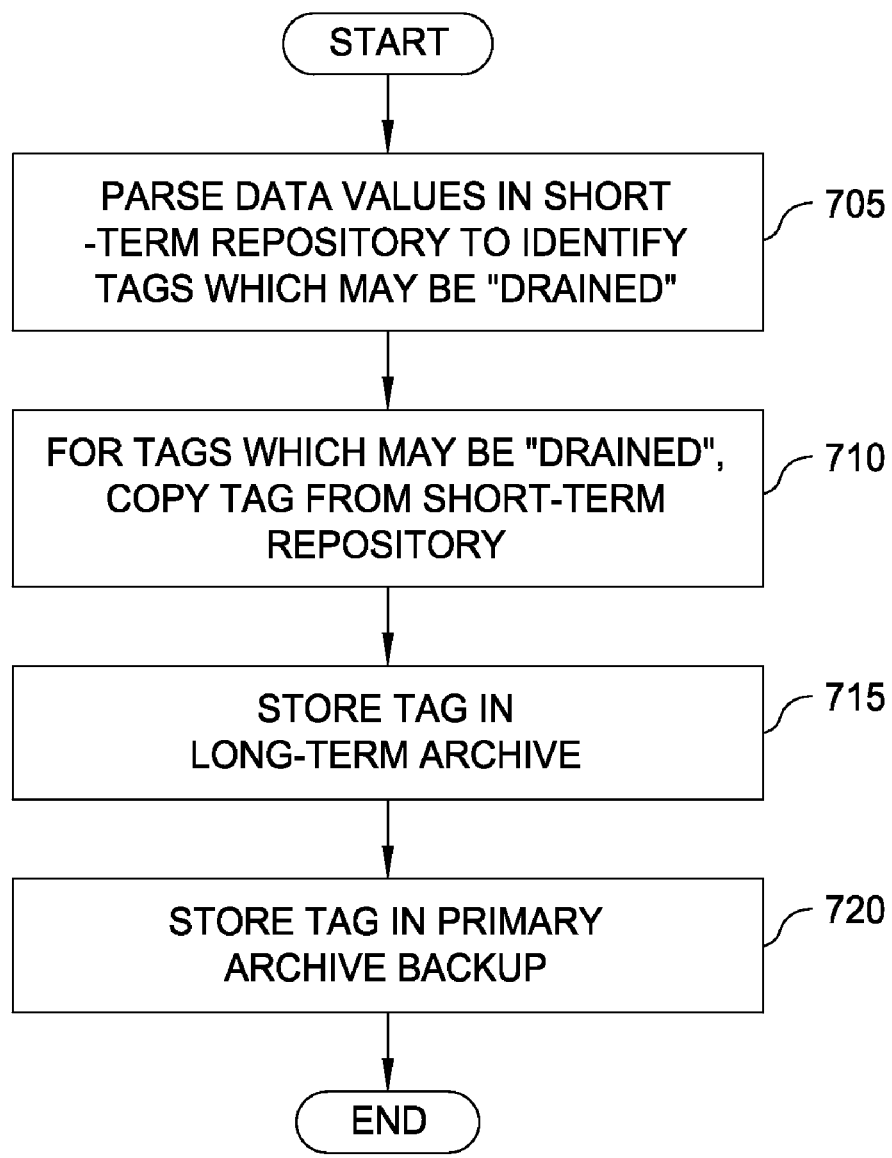
FIG. 7 is a flow diagram illustrating the operations of an archival processing application of an archive historian, according to one embodiment of the invention.

FIG. 7 is a flow diagram illustrating the operations 700 of an archival processing application of an archive historian (e.g., archive processor 205 of FIG. 2), according to one embodiment of the invention.

As shown, operations 700 begin at step 705 where the archive processor evaluates tags in the short term repository to identify tags that may be "drained" from the short-term repository. As described above, for example, tag categories 226 and tag definitions 227 may specify that tags of a given type should remain in the short term repository for a specific period of time, or short-term repository may allocate space for a specific number of tags of the given type. At step 710, the archive processor may remove the tags identified at step 705 from the short-term repository. At step 715, the tags identified at step 705 are stored in the long-term archive (e.g., the long-term archive 154 of FIG. 1). Additionally, in one embodiment, the archive process may also be configured to store tags identified at step 705 in a primary archive backup database (e.g., the backup database 240 of FIG. 2).

As described, new events to be archived in the historian (as captured in a tag) are first written to a short-term, high-availability repository, such as a memory-mapped database. As tags "fill" the short-term repository, an archival processor application may be configured to "drain" tags from the short-term repository and store them in a high-capacity, long-term archive, such as a disk-based database. Thus, the short-term repository may be used to provide fast access to the recent operational history of a monitored system, (e.g., a complex pipeline network), where long-term archive may be used to provide access to a comprehensive operational history of the monitored system. Further, an overflow file may be used to temporarily store tags waiting to be processed by the historian. Thus, rather than drop tags when the tag processor is overwhelmed, or when the short-term repository is "full," tags may be written to the overflow file for subsequent processing and storage in the historian.

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of archiving a plurality of data values from a real-time database in a historian system, wherein the historian system includes a short-term repository and a long-term archive, comprising:
   obtaining one of the plurality of data values from the real-time database, wherein the real-time database monitors a current operational state of an industrial system, wherein the plurality of data values correspond to information reflecting an operational state of one or more monitored devices of the industrial system, and wherein the obtained data value is stored in a tag that includes a timestamp and a tag ID identifying a monitored parameter in the real-time database;

evaluating the tag to determine whether to store the tag in the historian system;

upon determining to store the tag in the historian system, storing the tag in the short-term repository;

evaluating a set of tags in the short-term repository to determine whether to store any of the set of tags in the long-term archive; and upon determining to store one or more of the set of tags in the long-term archive, copying the tag from the short-term repository to the long-term archive and removing the tag from the short-term repository;

monitoring a rate at which data values are obtained by the historian system and monitoring a number of tags of a given type in the short-term repository;

upon determining that one of (i) the rate at which data values are obtained by the historian system exceeds a rate at which the historian system is able to process the data values and (ii) the number of tags of the given type in the short term repository exceeds an allocated number of tags of the given type, writing the data values to an overflow file.

2. The method of claim 1, wherein the short-term repository is a memory-mapped database.

3. The method of claim 1, wherein the long-term archive is a disk-based database.

4. The method of claim 1, wherein obtaining one of the plurality of data values from the real-time database comprises periodically retrieving a then current value of the data value from the real-time database.

5. The method of claim 1, wherein obtaining one of the plurality of data values from the real-time database comprises receiving a previous value of the data value, after the data value has changed by a predetermined amount in the real-time database.

6. The method of claim 1, further comprising, copying the one or more tags copied from the short-term repository to the long-term archive to a backup database.

7. The method of claim 1, wherein evaluating the set of tags in the short-term repository to determine whether to store any of the set of tags in the long-term archive comprises determining whether any of the set of tags have been in the short-term repository for a pre-determined time period.

8. The method of claim 1, wherein evaluating the set of tags in the short-term repository to determine whether to store any of the set of tags in the long-term archive comprises, determining whether the short-term repository has a maximum number of tags of a given type.

9. A computer-readable storage medium containing a program for archiving a plurality of data values from a real-time database in a historian system, the program including instructions for performing an operation, comprising:

obtaining one of the plurality of data values from the real-time database, wherein the real-time database monitors a current operational state of an industrial system, wherein the plurality of data values correspond to information reflecting an operational state of one or more monitored devices of the industrial system, and wherein the obtained data value is stored in a tag that includes a timestamp and a tag ID identifying a monitored parameter in the real-time database;

evaluating the tag to determine whether to store the tag in the historian system;

upon determining to store the tag in the historian system, storing the tag in the short-term repository;

evaluating a set of tags in the short-term repository to determine whether to store any of the set of tags in the long-term archive; and upon determining to store one or more of the set of tags in the long-term archive, copying the tag from the short-term repository to the long-term archive and removing the tag from the short-term repository;

monitoring a rate at which data values are obtained by the historian system and monitoring a number of tags of a given type in the short-term repository;

upon determining that one of (i) the rate at which data values are obtained by the historian system exceeds a rate at which the historian system is able to process the data values and (ii) the number of tags of the given type in the short term repository exceeds an allocated number of tags of the given type, writing the data values to an overflow file.

10. The computer-readable storage medium of claim 9, wherein the short-term repository is a memory-mapped database.

11. The computer-readable storage medium of claim 9, wherein the long-term archive is a disk-based database.

12. The computer-readable storage medium of claim 9, wherein obtaining one of the plurality of data values from the real-time database comprises periodically retrieving a then current value of the data value from the real-time database.

13. The computer-readable storage medium of claim 9, wherein obtaining one of the plurality of data values from the real-time database comprises receiving a previous value of the data value, after the data value has changed by a predetermined amount in the real-time database.

14. The computer-readable storage medium of claim 9, wherein the operation further comprises, copying the one or more tags copied from the short-term repository to the long-term archive to a backup database.

15. The computer-readable storage medium of claim 9, wherein evaluating the set of tags in the short-term repository to determine whether to store any of the set of tags in the long-term archive comprises determining whether any of the set of tags have been in the short-term repository for a pre-determined time period.

16. The computer-readable storage medium of claim 9, wherein evaluating the set of tags in the short-term repository to determine whether to store any of the set of tags in the long-term archive comprises, determining whether the short-term repository has a maximum number of tags of a given type.

17. A system for archiving a plurality of data values from a real-time database in a historian system, comprising:

the real-time database, wherein the real-time database stores a current value for the plurality of monitored data values, and wherein each of the plurality of data values correspond to information reflecting an operational parameter of one or more monitored devices of an industrial system;

the historian system, wherein the historian system includes a short-term repository and a long term archive, and wherein the historian system performs an operation comprising:

obtaining one of the plurality of data values from the real-time database, wherein the obtained data value is stored in a tag that includes a timestamp and a tag ID identifying a monitored parameter in the real-time database, evaluating the tag to determine whether to store the tag in the historian system, upon determining to store the tag in the historian system, store storing the tag in the short-term repository, evaluating a set of tags in the short-term repository to determine whether to store any of the set of tags in the long-term archive, and upon determining to store one or more of the set of tags in the long-term archive, copying the tag from the short-term repository to the long-term archive and removing the tag from the short-term repository; monitoring a rate at which data values are obtained by the historian system and monitoring a number of tags of a given type in the short-term repository; and upon determining that one of (i) the rate at which data values are obtained by the historian system exceeds a rate at which the historian system is able to process the data values and (ii) the number of tags of the given type in the short term repository exceeds an allocated number of tags of the given type, writing the data values to an overflow file.

18. The system of claim 17, wherein the short-term repository is a memory mapped database.

19. The system of claim 17, wherein the long-term archive is a disk-based database.

20. The system of claim 17, wherein the operation performed by the historian system wherein obtaining one of the plurality of data values from the real-time database comprises periodically retrieving a then current value of the data value from the real-time database.

21. The system of claim 17, wherein the operation performed by the historian system further comprises obtaining one of the plurality of data values from the real-time database comprises receiving a previous value of the data value, after the data value has changed by a predetermined amount in the real-time database.

22. The system of claim 17, wherein the operation performed by the historian system further comprises copying the one or more tags copied from the short-term repository to the long-term archive to a backup database.

23. The system of claim 17, wherein the operation performed by the historian system wherein evaluating the set of tags in the short-term repository to determine whether to store any of the set of tags in the long-term archive comprises determining whether any of the set of tags have been in the short-term repository for a predetermined time period.

24. The system of claim 17, wherein the operation performed by the historian system wherein evaluating the set of tags in the short-term repository to determine whether to store any of the set of tags in the long-term archive comprises determining whether the short-term repository has a maximum number of tags of a given type.

* * * * *

UNITED STATES PATENT AND TRADEMARK OFFICE
CERTIFICATE OF CORRECTION

| | |
|---|---|
| PATENT NO. | : 7,853,568 B2 |
| APPLICATION NO. | : 11/681063 |
| DATED | : December 14, 2010 |
| INVENTOR(S) | : Sulton Q. Mukhi |

It is certified that error appears in the above-identified patent and that said Letters Patent is hereby corrected as shown below:

In Column 12, line 65, replace the words "store storing" with the word --storing--.

Signed and Sealed this
Fourteenth Day of June, 2011

David J. Kappos
*Director of the United States Patent and Trademark Office*